Sept. 5, 1939. W. L. MORRISON 2,171,801
AUTOMOBILE
Original Filed Oct. 9, 1933   3 Sheets-Sheet 1

Inventor;
Willard L. Morrison,
By Parker & Carter
Attys.

Sept. 5, 1939.　　　W. L. MORRISON　　　2,171,801
AUTOMOBILE
Original Filed Oct. 9, 1933　　3 Sheets-Sheet 2
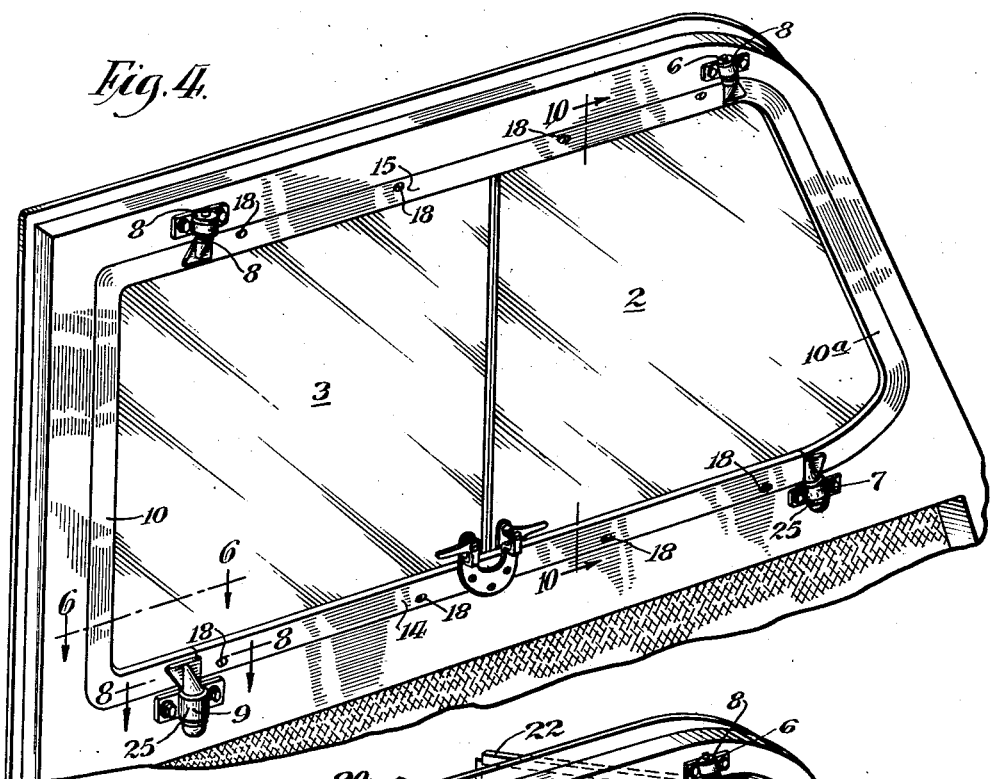
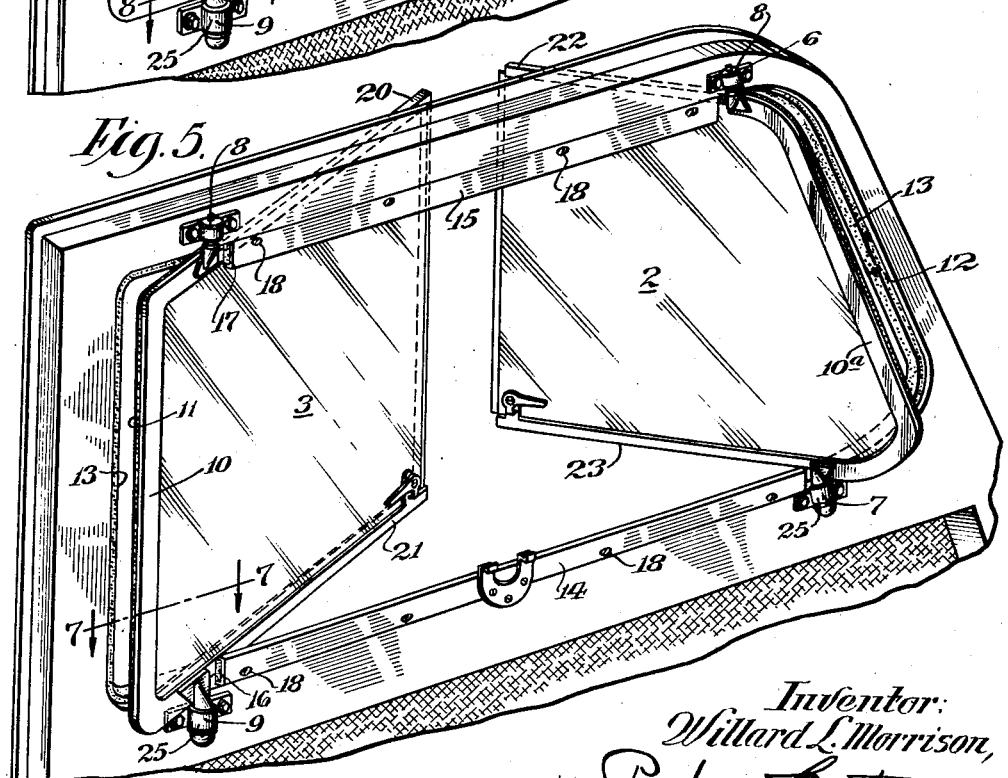
Inventor:
Willard L. Morrison,
By Parker & Carter
Attys.

Sept. 5, 1939. W. L. MORRISON 2,171,801
AUTOMOBILE
Original Filed Oct. 9, 1933 3 Sheets-Sheet 3
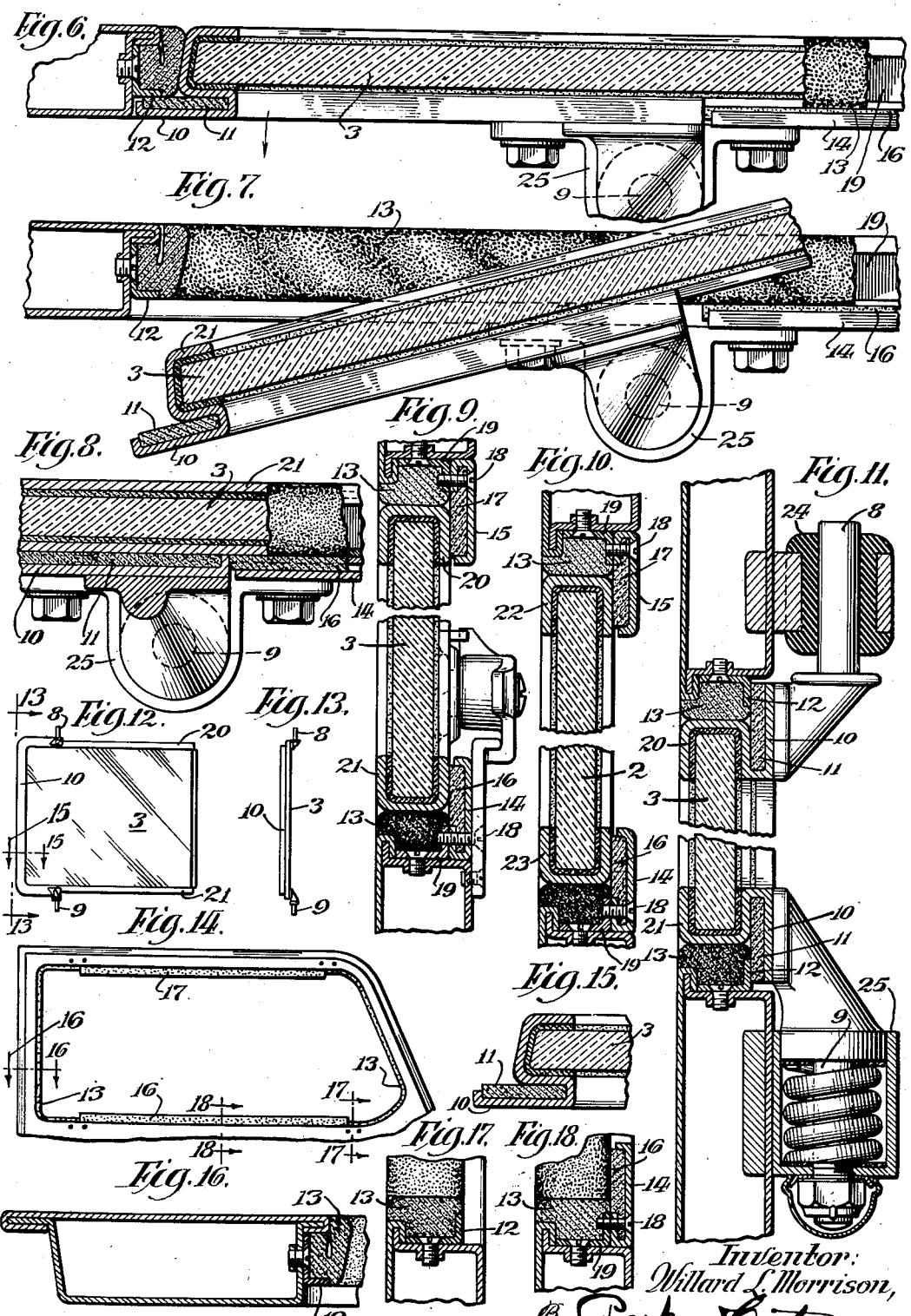

Patented Sept. 5, 1939

2,171,801

UNITED STATES PATENT OFFICE 2,171,801

AUTOMOBILE

Willard L. Morrison, Lake Forest, Ill.

Application October 9, 1933, Serial No. 692,728
Renewed December 24, 1936

7 Claims. (Cl. 296—44)

This invention relates to automobiles and has for its object to provide a new and improved device of this description. The invention has as a further object to provide an automobile having pivoted ventilating windows with sealing means arranged so that the sealing means will be all on the inside. The invention has as a further object to provide this window construction arranged so that the inside of the window will be flush with the walls surrounding the window opening. The invention has other objects which are more particularly pointed out in the accompanying description.

Referring now to the drawings, Fig. 1 is a view of an automobile embodying the invention;

Fig. 4 is a perspective inside view of the window shown in Fig. 2 with the windows in closed position;

Fig. 5 is a view similar to Fig. 4 showing the position of the parts when the window is in open position;

Fig. 6 is an enlarged sectional view taken on line 6—6 of Fig. 4;

Fig. 7 is an enlarged sectional view taken on line 7—7 of Fig. 5;

Fig. 8 is an enlarged sectional view taken on line 8—8 of Fig. 4;

Fig. 9 is a sectional view taken on line 9—9 of Fig. 2, with parts broken away;

Fig. 10 is a sectional view taken on line 10—10 of Fig. 4, with parts broken away;

Fig. 11 is an enlarged sectional view taken on line 11—11 of Fig. 2, with parts broken away;

Fig. 12 is a view showing one of the windows separate from the automobile;

Fig. 13 is a view of the windows shown in Fig. 12, as seen from line 13—13 of Fig. 12;

Fig. 14 is a view showing a portion of the sealing device attached to the automobile, the windows being removed;

Fig. 15 is an enlarged sectional view taken on line 15—15 of Fig. 12;

Fig. 16 is an enlarged sectional view taken on line 16—16 of Fig. 14;

Fig. 17 is a sectional view taken on line 17—17 of Fig. 14;

Fig. 18 is a sectional view taken on line 18—18 of Fig. 4.

Like numerals refer to like parts throughout the several figures.

Figure 1:
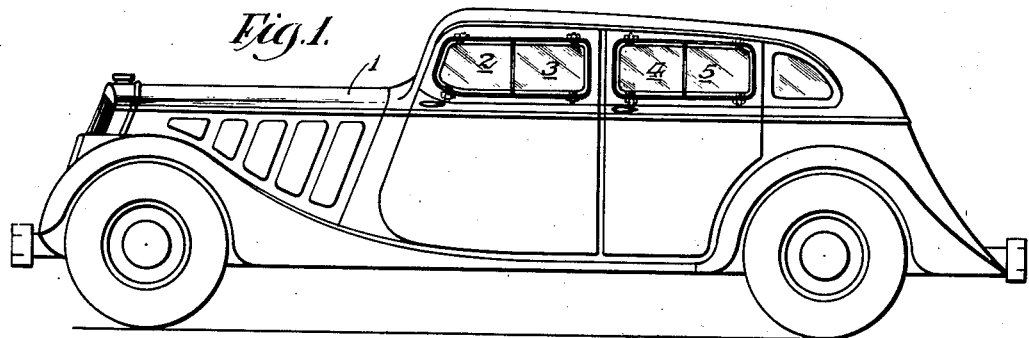
Figure 2:
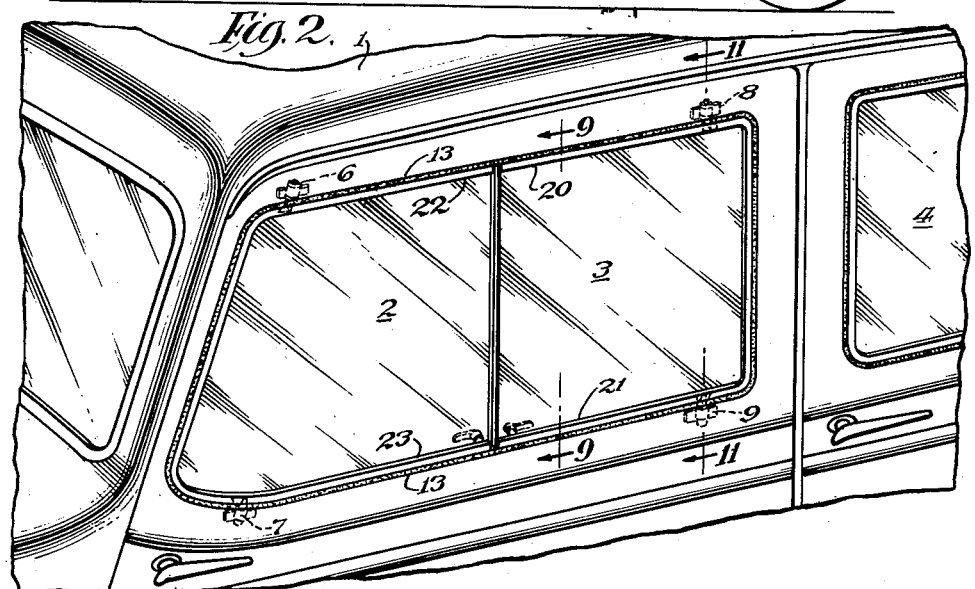
Fig. 2 is an enlarged perspective view of the front windows of the automobile shown in Fig. 1, with the windows closed.
Figure 3:
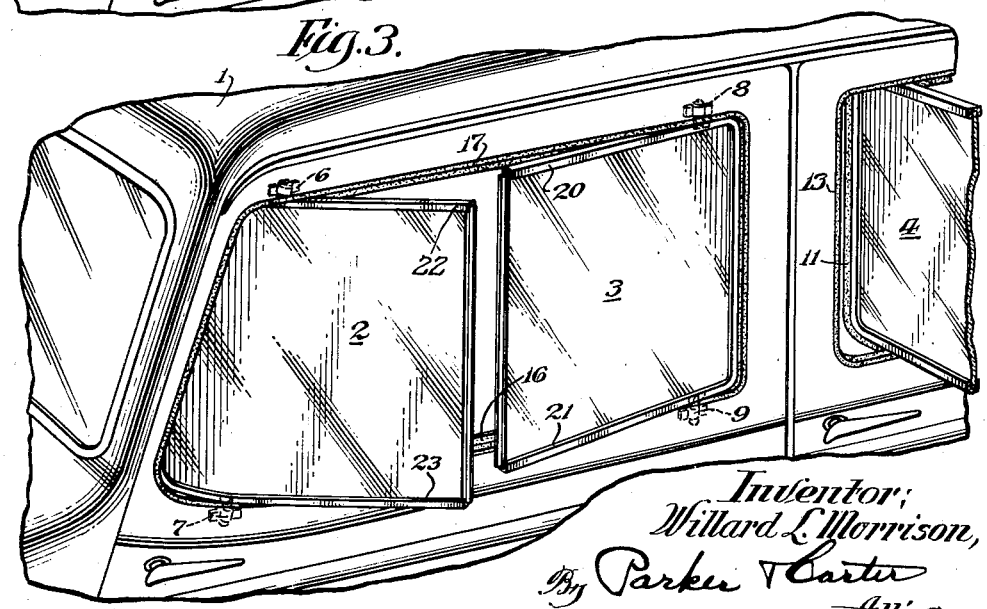
Fig. 3 is a view similar to Fig. 2 with the windows in an open position.

Referring now to the drawings, I have shown an automobile 1 having the windows 2, 3, 4 and 5. These windows are pivoted between the ends, the window 2 being provided with the upper pivot 6 and the lower pivot 7, and the window 3 being provided with the upper pivot 8 and the lower pivot 9. These windows have their edges adjacent and are each pivoted between their ends and at opposite ends, as clearly shown in Fig. 2.

A sealing device is arranged for sealing the windows when closed, and in this construction the sealing device is all on the inside of the automobile. This is clearly shown in Figs. 5, 9, 10 and 11.

Referring to Fig. 5, the window 3 has connected with it on one side of the pivots 8 and 9 and on the side on the inside of the car a sealing device which consists of a member 10 extending along the vertical edge of the window and partially along the horizontal edges at the top and bottom. This rigid member has a packing member 11, shown in Figs. 7 and 11, which when the window is closed engages the part 12 located within the window opening, and which in this instance supports a packing member 13. The window 2 has a similar member 10a with a packing member connected therewith. Attached to the automobile on the inside thereof is a sealing device 14, there being a similar sealing device 15 at the top. The sealing devices 14 and 15 consist of pieces of rigid material with packing material 16 and 17 connected therewith. These pieces 14 and 15 and the packing material are attached by suitable fastening devices 18 with the members 19 attached to the automobile. The members 14 and 15 and 10 and 10a are preferably of metal. The pivots 8 and 9 are attached to the member 10, and the pivots 6 and 7 are attached to the member 10a. It will be noted that the members 10 and 10a are in proximity to the pivots and that the ends of the members 14 and 15 are brought up near the pivots so that the windows can be moved about their pivots, but that when the windows are in their closed positions the ends of the members 14 and 15 are in close proximity to the ends of the members 10 and 10a so as to form a substantially continuous metal member surrounding the two windows, as clearly shown in Fig. 4.

The window 3 has at the top and bottom the frame members 20 and 21, and the window 2 has the frame members 22 and 23. These frame members extend beyond the pivots to the adjacent ends of the windows. When the windows are closed, as shown in Fig. 4, the frame members 20, 21, 22 and 23 engage the face of the rubber or packing 16 and 17 forming a part of the packing members 15 and 14, and the rubber or packing 11 on the members 10 and 10a engage members 12 on the automobile, see Fig. 11, so that the windows are completely sealed.

I prefer to have the inside members 10, 10a, 14 and 15 flush with the wall surrounding the window opening, see Figs. 10 and 11. In order to do this I use an inside pivot, as shown in Fig. 11. These pivots project inwardly from the frame members to which they are attached and are mounted in suitable supports 24 and 25 attached to the wall surrounding the window opening, as clearly shown in Fig. 11. I have shown the pivot 9 as being a friction pivot.

It will further be noted that in this construction the outer face of the windows, which in this case is the face of the frame members connected with them, is flush with the outer face of the automobile surrounding the window opening.

It will be noted in this construction that the sealing device for the windows are all on the inside of the automobile, without interfering with the pivotal movement of the windows.

I claim:

1. An automobile comprising a part with a window opening, a window therein, pivots which pivotally mount said window in said window opening, the pivots being in a plane at one side of the movable window intermediate the ends of the window and connected with said window, the window being moved to its open and closed positions by a pivotal movement on said pivots, and a sealing device for said window having vertically extending sealing faces extending substantially entirely around the window and opposite said pivots, the sealing device being rendered operative by the pivotal movement of the window about its pivot to its closed position, all of said sealing device being on the same side of the window.

2. An automobile comprising a part with a window opening, a window therein, pivots which pivotally mount said window in said window opening, the pivots being intermediate the ends of the window and connected with said window, the window being moved to its open and closed positions by a pivotal movement on said pivots, and a sealing device for said window having vertically extending sealing faces extending substantially entirely around the window and opposite said pivots, the sealing device being rendered operative by the pivotal movement of the window about its pivot to its closed position, a portion of the sealing device on one side of the pivots being attached to the window and being in a plane substantially parallel to the window glass and intermediate the window glass and the pivot, and the portion of the sealing device on the other side of the pivots being attached to the automobile.

3. An automobile comprising a part with a window opening, a window therein, pivots which pivotally mount said window in said window opening, the pivots being intermediate the ends of the window and connected with said window, the window being moved to its open and closed positions by a pivotal movement on said pivots, and a sealing device for said window having vertically extending sealing faces extending substantially entirely around the window and opposite said pivots, the sealing device being rendered operative by the pivotal movement of the window about its pivot to its closed position, a portion of the sealing device on one side of the pivots being attached to the window and being in a plane substantially parallel to the window glass and intermediate the window glass and the pivot, and the portion of the sealing device on the other side of the pivots being attached to the automobile, the pivots being attached to the portion of the sealing device which is attached to the window.

4. An automobile comprising a part with a window opening, a window therein, pivots which pivotally mount said window in said window opening, the pivots being intermediate the ends of the window and connected with said window, the window being moved to its open and closed positions by a pivotal movement on said pivots, and a sealing device for said window having vertically extending sealing faces extending substantially entirely around the window and opposite said pivots, the sealing device being rendered operative by the pivotal movement of the window about its pivot to its closed position, a portion of the sealing device on one side of the pivots being attached to the window and being in a plane substantially parallel to the window glass and intermediate the window glass and the pivot, and the portion of the sealing device on the other side of the pivots being attached to the automobile, both portions of the sealing device being on the inside of the automobile when the window is closed.

5. An automobile comprising a part with a window opening, two windows therein, pivots located between the ends of said windows for pivotally mounting said windows in the window opening connected with said window, the window being moved to its open and closed positions by a pivotal movement on said pivots, a sealing device for said windows having a part thereof fastened to the windows and a part thereof fastened to the automobile the sealing device attached to the window being in a plane substantially parallel to the window glass and intermediate the window glass and the pivots, all of the parts being on the same side of the windows.

6. An automobile comprising a part with a window opening, two windows therein, pivots located between the ends of said windows for pivotally mounting said windows in the window opening connected with said window, the window being moved to its open and closed positions by a pivotal movement on said pivots, a sealing device for said windows having a part thereof fastened to the windows and a part thereof fastened to the automobile the sealing device attached to the window being in a plane substantially parallel to the window glass and intermediate the window glass and the pivots, all of the parts being on the same side of the windows, the part of said sealing device attached to the automobile comprising two members, one at the top and one at the bottom, said members extending along the window opening between said pivots.

7. In an automobile comprising a part with a window opening, a window therein, pivots connected with said window, and a sealing device for the window, a part of which is attached to the window, said part being in a plane substantially parallel to the window glass and intermediate the window glass and the pivot.

WILLARD L. MORRISON.